United States Patent
Williamson

(10) Patent No.: US 12,276,304 B2
(45) Date of Patent: Apr. 15, 2025

(54) SELF-LOCKING BUSHINGS

(71) Applicant: Goodrich Corporation, Charlotte, NC (US)

(72) Inventor: James Keith Williamson, Fairview Park, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 154 days.

(21) Appl. No.: 18/077,011

(22) Filed: Dec. 7, 2022

(65) Prior Publication Data
US 2024/0191750 A1 Jun. 13, 2024

(51) Int. Cl.
F16C 33/04 (2006.01)
F16C 11/04 (2006.01)
F16C 11/10 (2006.01)
B33Y 80/00 (2015.01)

(52) U.S. Cl.
CPC ............ *F16C 33/04* (2013.01); *F16C 11/045* (2013.01); *F16C 11/10* (2013.01); *B33Y 80/00* (2014.12); *F16C 2326/43* (2013.01)

(58) Field of Classification Search
CPC .......... F16C 17/02; F16C 33/04; F16C 35/02; F16C 43/02; F16C 2326/43
See application file for complete search history.

(56) References Cited

U.S. PATENT DOCUMENTS

| 4,624,585 | A | * | 11/1986 | Nix | F16C 11/04 411/509 |
| 5,259,689 | A | * | 11/1993 | Arand | F16D 1/033 403/337 |
| 5,945,606 | A | * | 8/1999 | Tokunaga | G01L 19/0007 73/756 |
| 9,216,853 | B2 | | 12/2015 | Caruso | |
| 9,409,267 | B2 | | 8/2016 | Plantan | |
| 9,534,627 | B2 | * | 1/2017 | Weber | F16B 21/075 |
| 9,915,280 | B2 | * | 3/2018 | Hagan | F16B 19/1081 |
| 10,753,224 | B2 | | 8/2020 | Mena Dominguez | |
| 2022/0220988 | A1 | | 7/2022 | Sanchez | |

FOREIGN PATENT DOCUMENTS

| EP | 2282066 | 2/2011 |
| EP | 2719907 | 4/2014 |

OTHER PUBLICATIONS

European Patent Office, European Search Report dated Mar. 15, 2024 in Application No. 23215027.6.

* cited by examiner

*Primary Examiner* — James Pilkington
(74) *Attorney, Agent, or Firm* — SNELL & WILMER L.L.P.

(57) ABSTRACT

A bushing is disclosed herein. The bushing includes a body having a first end and a second end, a bore formed through the body from the first end to the second end, and a lock tab coupled to the body at a point between the first end and the second end of the body and extending toward the second end of the body, the lock tab extending from the body and into the bore.

19 Claims, 7 Drawing Sheets

SELF-LOCKING BUSHINGS

FIELD

The present disclosure generally relates to bushings, and more particularly, to self-locking bushings.

BACKGROUND

Landing gear components generally use bushings at connection points between components. Bushings are generally suitable for rotating, oscillating, and linear movements and different varieties of bushings may accommodate radial and axial loads. In some cases, movement of the bushing, either linear or rotational, is not desired. The bushing may migrate and/or rotate during operation of the components joined using a bushing, such as landing gear components. Different styles and configurations of bushings have been designed to address the problem of migrating and/or rotating bushings.

SUMMARY

A bushing is disclosed herein. The busing includes a body having a first end and a second end, a bore formed through the body from the first end to the second end, and a lock tab coupled to the body at a point between the first end and the second end of the body and extending toward the second end of the body, the lock tab extending from the body and into the bore.

In various embodiments, the busing further includes a flange coupled to the first end of the body. In various embodiments, the bushing further includes a tapered end formed into the second end of the body. In various embodiments, the body is cylindrical. In various embodiments, the lock tab includes a first member extending from the body and a second member extending orthogonally from the first member. In various embodiments, the bushing is formed as a monolithic component using 3D printing. In various embodiments, the bushing further includes a spacer having a first end and a second end, the first end of the spacer coupled to the lock tab and the second end of the spacer coupled to the body.

Also disclosed herein is a landing gear assembly. The landing gear assembly includes a dynamic joint, a locking pin, and a bushing coupled to the dynamic joint. The bushing includes a body having a first end and a second end, a bore formed through the body from the first end to the second end, and a lock tab coupled to the body and extending from the body and into the bore, the lock tab extending toward the second end of the body, wherein the locking pin extends through the bore engaging the lock tab.

In various embodiments, the dynamic joint further includes a first component and a second component with the bushing extending through the first component and the second component to form secure the dynamic joint. In various embodiments, the lock tab engages the first component preventing lateral movement of the bushing in a first direction. In various embodiments, the lock tab includes a first member extending from the body and a second member extending orthogonally from the first member, the second member engaging the first component. In various embodiments, the bushing further includes a flange coupled to the first end of the body, the flange preventing lateral movement of the bushing in a second direction opposite the first direction. In various embodiments, the bushing further includes a tapered end formed into the second end of the body. In various embodiments, the body is cylindrical.

Also disclosed herein is a self-locking bushing. The self-locking bushing includes a cylindrical body extending from a first end to a second end, a cylindrical bore formed through the cylindrical body from the first end to the second end, a first lock tab extending from the cylindrical body toward the second end, the first lock tab extending into the cylindrical bore in a first direction, and a second lock tab extending from the cylindrical body toward the second end, the second lock tab extending into the cylindrical bore in a second direction that is different than the first direction.

In various embodiments, the cylindrical body has a first length and the first lock tab has a second length, the second length being less than the first length. In various embodiments, the second length is about 30% to about 70% of the first length. In various embodiments, the first lock tab is formed from the cylindrical body, the cylindrical body and the first lock tab being a monolithic piece. In various embodiments, the self-locking bushing further includes a tapered end formed into the second end of the cylindrical body and a flange coupled to the first end of the cylindrical body. In various embodiments, the first lock tab includes a first portion extending from the cylindrical body and a second portion extending orthogonal to the first portion.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a self-locking bushing for use in various applications, including aircraft landing gear. In various embodiments, the self-locking bushing may include one or more lock tabs formed in the body of the self-locking bushing. In various embodiments, the lock tabs may be about half the length of the bushing. In various embodiments, the lock tabs may extend into the body of the self-locking bushing prior to installation, the lock tabs being pressed outward into the locked position by a pin inserted through the body of the self-locking bushing. In various embodiments, one or more spacers may be placed between the body of the self-locking bushing and the lock tab to hold the lock tab in place prior to installation. The one or more spacers may be detached and/or removed from the self-locking bushing by the pin being inserted into the bushing. In various embodiments, the lock tabs may include a portion extending orthogonally to the lock tab to engage an outer sleeve after installation, locking the self-locking bushing in place.

In various embodiments, the self-locking bushing may be 3D printed. In various embodiments, the spacers may be 3D printed with the self-locking bushing. In various embodiments, the self-locking bushing may be 3D printed without the spacers. In various embodiments, the self-locking bushing may be milled using traditional methods. As disclosed herein, the self-locking bushing may reduce and/or eliminate migration issues (e.g., lateral movement of the bushing). In various embodiments, the self-locking bushing may further reduce and/or eliminate rotation of the self-locking bushing.

Figure 1:
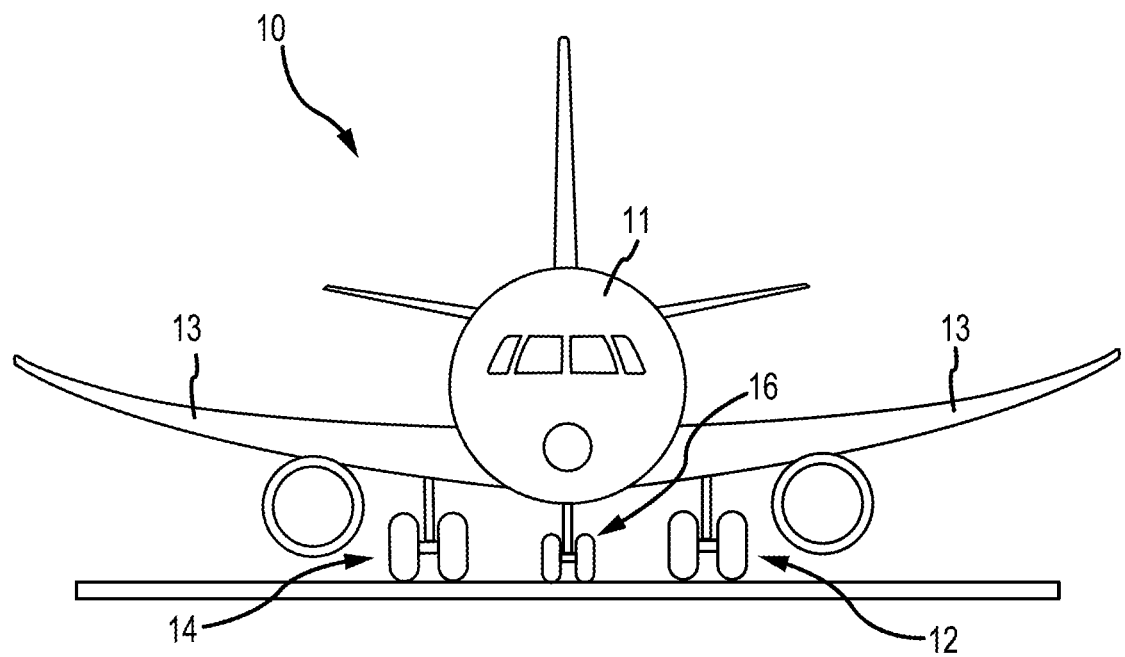
FIG. 1 illustrates an aircraft, in accordance with various embodiments.
Figure 1:
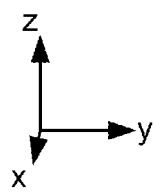

Referring now to FIG. 1, an aircraft 10 is illustrated, in accordance with various embodiments. Aircraft 10 includes a fuselage 11 and wings 13. Aircraft 10 includes landing gear such as left landing gear assembly 12, right landing gear assembly 14, and nose landing gear assembly 16 (referred to herein collectively as landing gear assemblies 12, 14, 16). Landing gear assemblies 12, 14, 16 may generally support aircraft 10, when aircraft 10 is not flying, allowing aircraft 10 to taxi, take-off, and land without damage. Landing gear assemblies 12, 14, 16 may each include various shock and strut assemblies with one or more wheels attached thereto. Landing gear assemblies 12, 14, 16 may each be configured to translate between a landing gear down position, wherein the landing gear assemblies extend from wings 13 and/or fuselage 11 to support aircraft 10, and a landing gear up position, wherein the landing gear assemblies are located within wings 13 and/or fuselage 11 of aircraft 10. For example, during taxiing and take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing.

Figure 2:
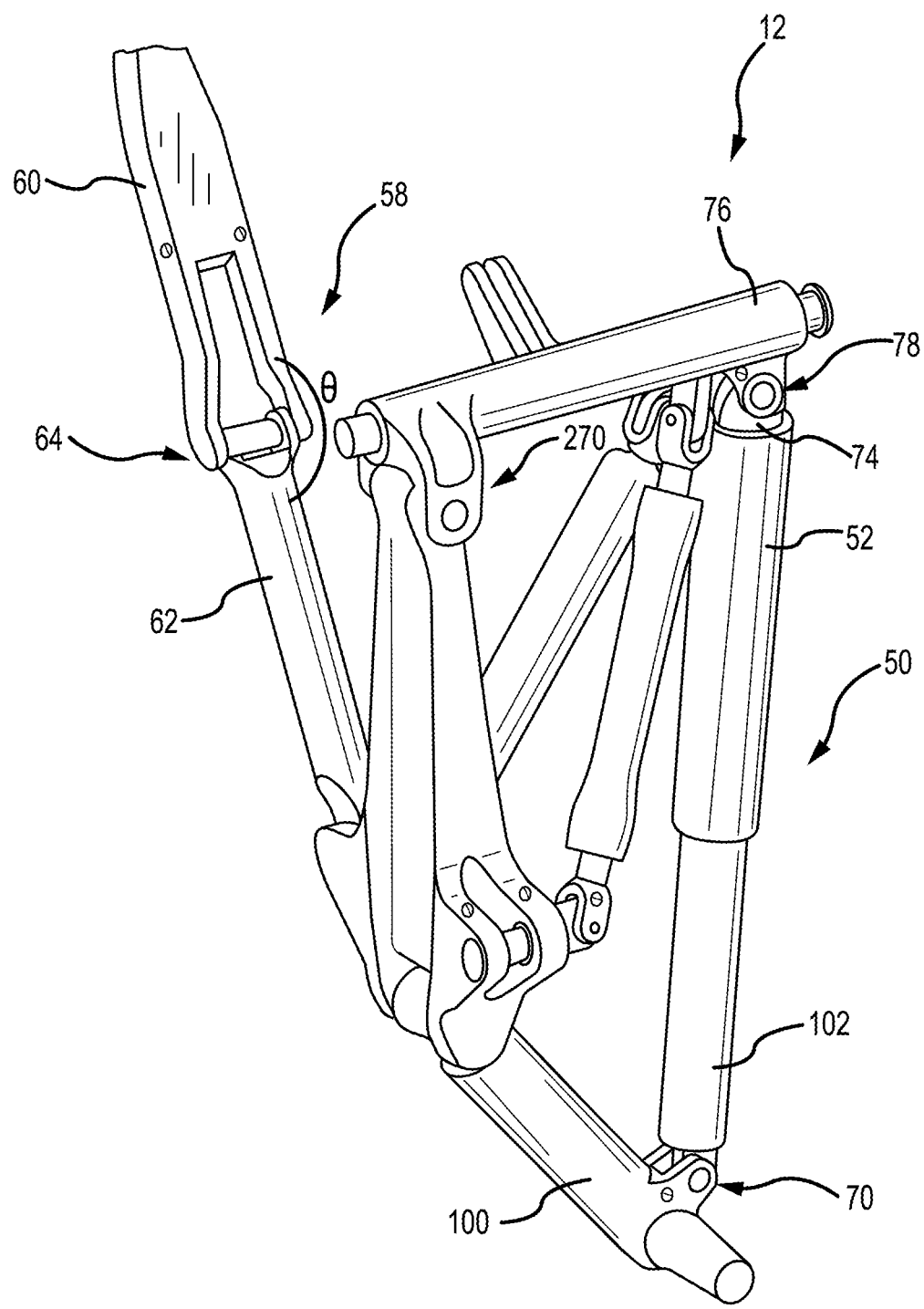
FIG. 2 illustrates components of a landing gear assembly, in accordance with various embodiments.

Referring now to FIG. 2, and with continued reference to FIG. 1, components of left landing gear assembly 12 are illustrated, in accordance with various embodiments. While FIG. 2 illustrates components of left landing gear assembly 12, it should be understood that right landing gear assembly 14 and nose landing gear assembly 16 may include the elements and functionalities as described herein with respect to left landing gear assembly 12.

Left landing gear assembly 12 may include one or more shock absorbing devices, such as for example, shock strut 50. Shock strut 50 may absorb and damp loads imposed on left landing gear assembly 12 during landing, taxiing, braking, and takeoff. Shock strut 50 may include a cylinder and a strut configured to telescope relative to the cylinder. Left landing gear assembly 12 may include various linkage assemblies, such as, for example, linkage assembly 58. Linkage assembly 58 may be configured to translate left landing gear assembly 12 between the landing gear up and landing gear down positions.

In accordance with various embodiments, various components of left landing gear assembly 12 may be coupled to one another via dynamic joints. For example, a first strut 60 of linkage assembly 58 may be coupled to a second strut 62 of linkage assembly 58 via a dynamic joint 64. As used herein, a "dynamic joint" refers to a coupling between a first component and a second component, wherein the first component and/or the second component is/are configured to pivot about the dynamic joint such that an angle of the first component relative to the second components changes. For example, during landing gear extension and retraction (i.e., when left landing gear assembly 12 is translated between the landing gear down and landing gear up positions), second strut 62 pivots about dynamic joint 64 such that an angle theta ($\theta$) between first strut 60 and second strut 62 changes. Left landing gear assembly 12 may include multiple dynamic joints.

In accordance with various embodiments, various components of left landing gear assembly 12 may be coupled to one another via static joints. For example, an end 74 of shock strut cylinder 52 may be coupled to an upper linkage (or strut) 76 via a static joint 78. As used herein, a "static joint" refers to a coupling between a first component and a second component, wherein the first and second component do not pivot about the joint. For example, when left landing gear assembly 12 is translated between the landing gear down and landing gear up positions, the angle between end 74 of shock strut 50 and upper linkage 76 remains relatively constant. While components coupled via a static joint do not rotate, it is further contemplated and understood that the components may exhibit some motion due to structural deflections of the joint generated by loads applied to the landing gear assembly.

In accordance with various embodiments, each of the dynamic joints and static joints of left landing gear assembly 12 comprises a first component coupled to a second component via a pin connection. In other words, each of the dynamic joints and static joints of left landing gear assembly 12 includes a pin located through a first component and through a second component.

Figure 3:
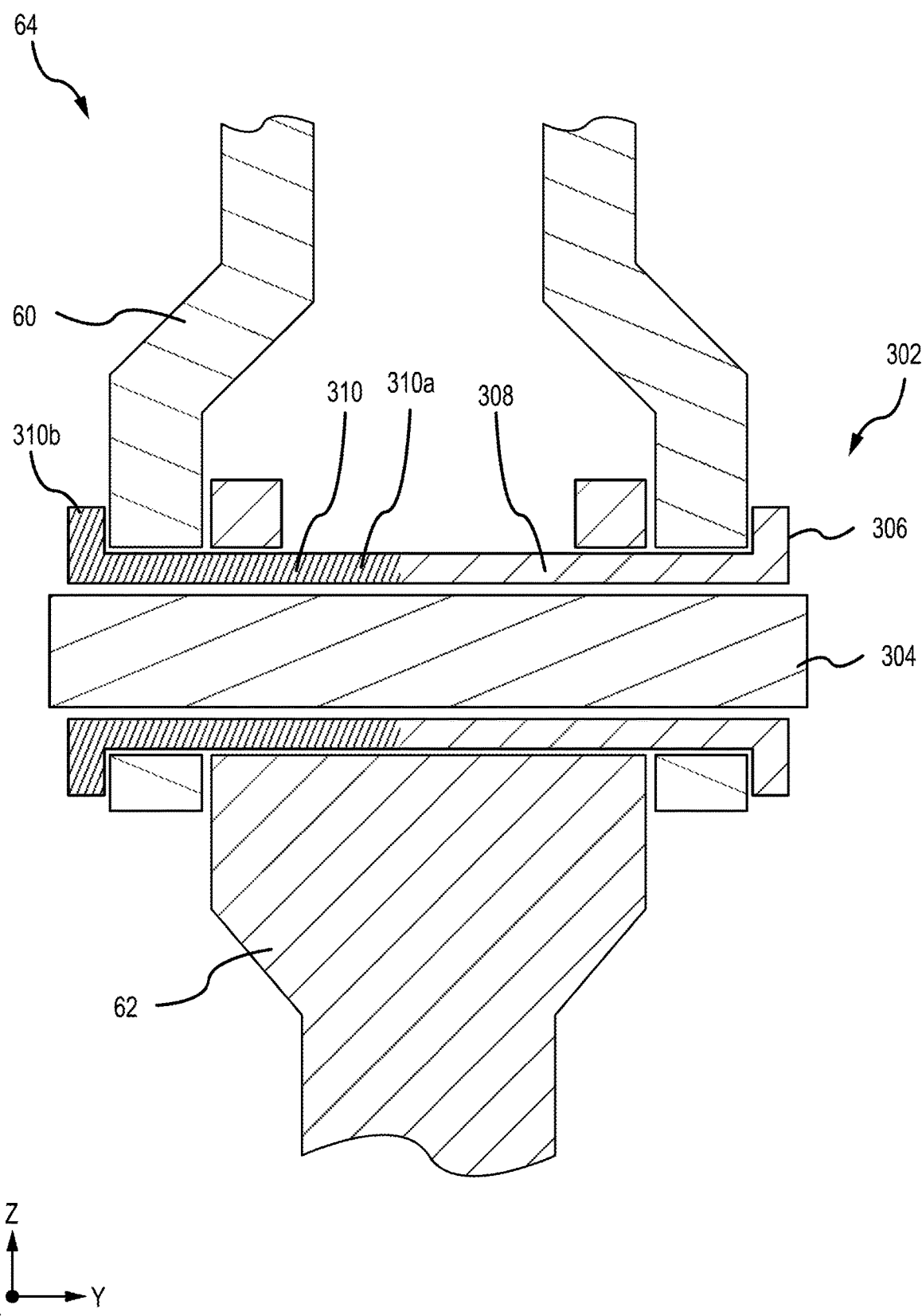
FIG. 3 illustrates a cross section of a landing gear joint including a self-locking bushing, in accordance with various embodiments.

Referring now to FIG. 3, and continuing reference to FIG. 2, a cross-section view of a dynamic joint 64 of left landing gear assembly 12 is illustrated, in accordance with various embodiments. While FIG. 3 illustrates components of dynamic joint 64, it should be understood that any of the dynamic joints of left landing gear assembly 12 may include the elements and functionalities as described herein with respect to dynamic joint 64.

At dynamic joint 64, first strut 60 is coupled to second strut 62 via a self-locking bushing 302 and a pin 304. First strut 60 and second strut 62 may pivot, relative to one another, about self-locking bushing 302 and pin 304.

Self-locking bushing 302 may include a flange 306, a body 308, and one or more lock tabs 310. In various embodiments self-locking bushing may be a single monolithic component. In various embodiments, self-locking bushing may be formed from multiple components. Flange 306 may prevent self-locking bushing 302 from moving in a first lateral direction (e.g., the negative Y direction) with respect first strut 60 and second strut 62. In various embodiments, body 308 is cylindrical. In various embodiments, body 308 is a rectangular prism.

Lock tab(s) 310 may include a first portion 310a and a second portion 310b. In various embodiments, as illustrated in FIG. 3, second portion 310b is orthogonal to first portion 310a. Second portion 310b of lock tab(s) 310 may prevent self-locking bushing 302 from moving in a second lateral direction opposite the first lateral direction (e.g., the Y direction) with respect to the first strut 60 and the second strut 62. In various embodiments, lock tab(s) 310 may be a single monolithic member or a combination of smaller members. Lock tab(s) 310 are coupled to body 308. In various embodiments, lock tab(s) 310 is about half the length of body 308.

Figure 4A:
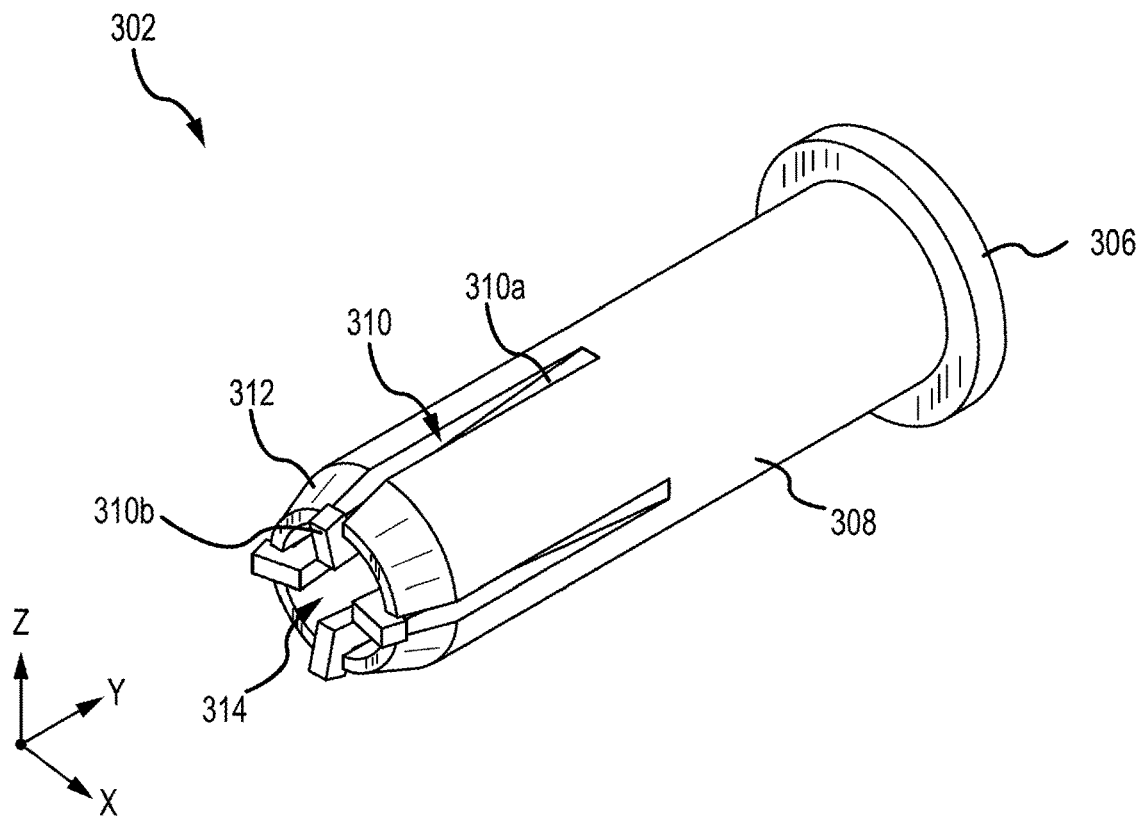
FIGS. 4A, 4B, and 4C illustrate various views of a self-locking bushing prior to installation, in accordance with various embodiments.
Figure 4B:
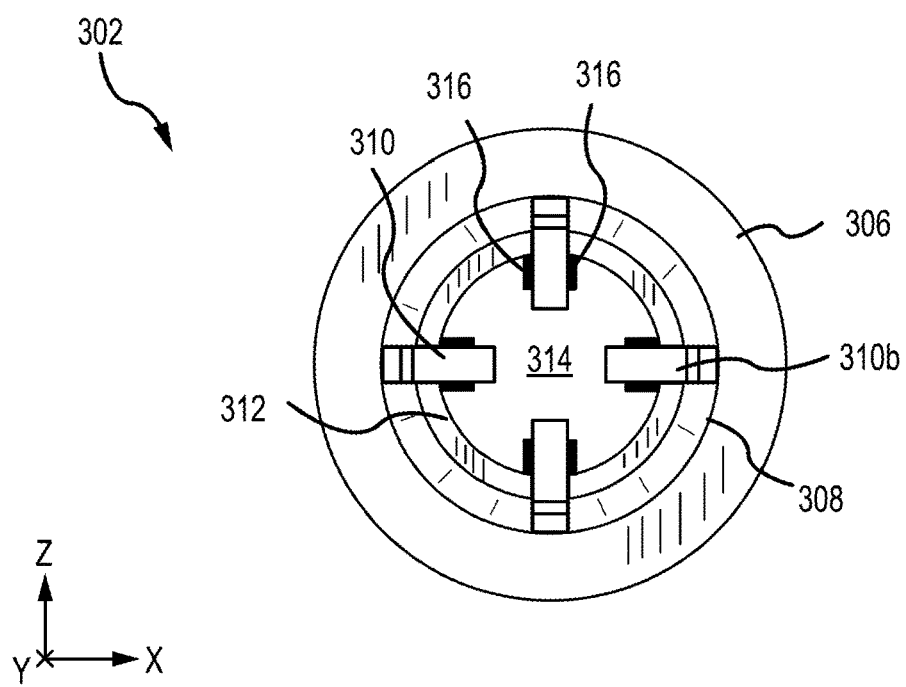
Figure 4C:
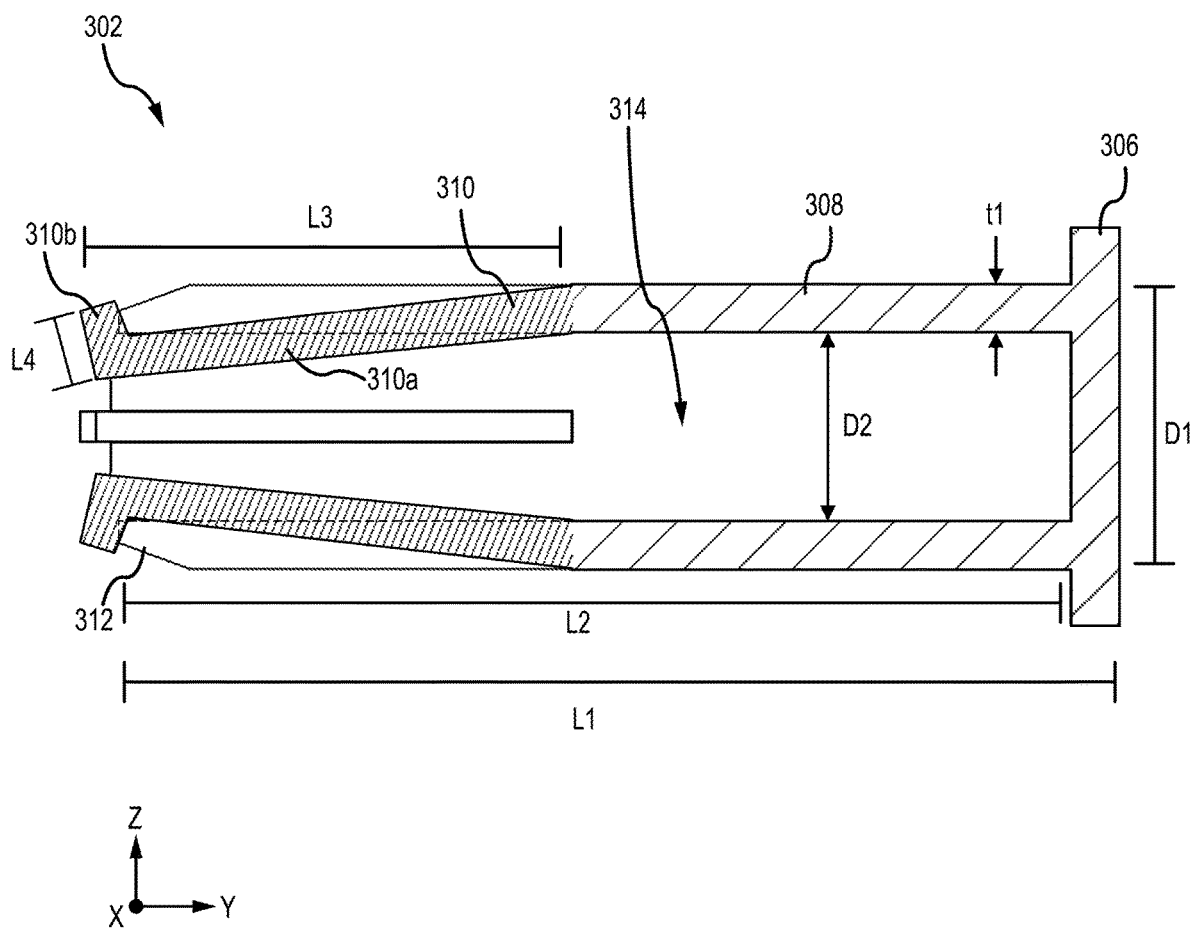

Referring now to FIGS. 4A-4C, illustrated are various views of self-locking bushing 302 prior to installation, in accordance with various embodiments. FIG. 4A illustrates a perspective view of self-locking bushing 302. FIG. 4B illustrates an end view of self-locking bushing 302. FIG. 4C illustrates a cross section view of self-locking bushing 302. As previously described, self-locking bushing 302 includes flange 306 at a first end of self-locking bushing 302, body 308, and one or more lock tabs 310. Self-locking bushing 302 further includes a tapered end 312 at a second end of self-locking bushing 302 and a bore 314 within body 308. In various embodiments, self-locking bushing 302 may further include one or more spacers 316 to secure the one or more lock tabs 310 to body 308 prior to installation. Tapered end 312 may allow for self-locking bushing 302 to engage a fitting (e.g., first strut 60 and second strut 62) with fewer interferences.

In various embodiments, self-locking bushing 302 may include two or more lock tabs 310 to secure self-locking bushing 302 after installation. As illustrated in FIGS. 4A-4C, self-locking bushing 302 includes four lock tabs 310 with each lock tab 310 offset from each adjacent lock tab 310 by 90°. As illustrated in FIG. 4B, the four lock tabs 310 are positioned on top, bottom, left, and right (e.g., positive Z direction, negative Z direction, negative X direction, and positive X direction, respectively) of body 308. In various embodiments, there may be two lock tabs 310. In various embodiments, the two lock tabs 310 may be offset from each other by 180°. In various embodiments, there may be three lock tabs 310. In various embodiments, the three lock tabs 310 may be offset from each by 120°. In various embodiments, there may be more than four lock tabs 310 with each lock tab 310 being offset from an adjacent lock tab 310 by a uniform or non-uniform distance.

Body 308 of self-locking bushing 302 has a diameter D1. In various embodiments, flange 306 has a diameter that is greater than diameter D1. Bore 314 has a diameter D2 that is less than diameter D1. A sidewall of body 308 has a thickness t1 that is about equal to the difference between diameter D1 and diameter D2. In various embodiments, diameter D2 may be about 75% to about 95% of diameter D1, and more specifically about 80% to about 90% of diameter D1. Diameter D1 of body 308 may be any diameter in use by various bushings and for various purposes. In various embodiments, diameter D1 may be about 0.75 inches (about 1.9 centimeters) to about 13 inches (about 33 centimeters), and more specifically, about 2 inches (about 5.1 centimeters) to about 10 inches (about 25 centimeters). Diameter D2 of bore 314 may be any diameter that is smaller than diameter D1 and in use by various bushings and for various purposes. In various embodiments, diameter D2 may be about 0.5 inches (about 1.3 centimeters) to about 12 inches (about 30 centimeters), and more specifically about 1.5 inches (about 3.8 centimeters) to about 9.5 inches (about 24 centimeters).

Self-locking bushing 302 has a length L1 that includes flange 306 and body 308. Body 308 has a length L2 that is less than length L1. Lock tabs 310 have a length L3 that is less than length L2 and length L1. Length L3 may be about 30% to about 70% of length L2, and more specifically about 40% to about 60% of length L2. In various embodiments, length L3 may be about 50% of length L2. Length L1 may be any length in use by various bushings and for various purposes. In various embodiments, length L1 may be about 2 inches (about 5.1 centimeters) to about 20 inches (about 51 centimeters), and more specifically, about 4 inches (about 10 centimeters) to about 10 inches (about 25 centimeters). In various embodiments, length L2 may be about 1.75 inches (about 4.4 centimeters) to about 19.75 inches (about 50 centimeters), and more specifically, about 3.75 inches (about 9.5 centimeters) to about 9.75 inches (about 25 centimeters). In various embodiments, length L3 may be about 0.5 inches (about 1.3 centimeters) to about 14 inches (about 36 centimeters), and more specifically about 1.2 inches (about 3 centimeters) to about 7 inches (about 18 centimeters). Second portion 310b of lock tab 310 has a length L4 that is greater than thickness t1 in order to engage an external piece (e.g., first strut 60 or second strut 62) thereby locking self-locking bushing 302 laterally (e.g., in the Y direction) in place. In various embodiments, length L4 may be about 105% to about 125% of thickness t1, and more specifically, about 110% to about 120% of thickness t1.

Self-locking bushing 302 may be manufactured by various methods including machining and 3D printing (e.g., additively manufactured). For example, in embodiments where self-locking bushing 302 is machined, and initial machining step may form self-locking bushing 302 to specific dimensions (e.g., length L1, diameter D1, diameter D2, length L4, etc.). After the initial machining, body 308 of self-locking bushing 302 may be precisely cut to form lock tabs 310 (e.g., length L3). After cutting, lock tabs 310 may be bent inward into bore 314 so that second portion 310b of lock tab 310 does not extend above body 308. In various embodiments, second portion 310b may not extend above tapered end 312. In various embodiments, one or more spacers 316 may be inserted between each lock tab 310 and body 308 of self-locking bushing 302. In various embodiments, lock tabs 310 may retain their bent position, extending inward into bore 314. When formed using a conventional machining process, lock tabs 310 may be in a stressed state after being bent inward into bore 314.

In another example, in embodiments where self-locking bushing 302 is 3D printed, flange 306, body 308, and lock tabs 310 may be formed in a single process. In various embodiments, one or more spacers 316 may be formed as part of the 3D printing process. In such a process, lock tabs 310 may be formed extended inward into bore 314 without being pushed, or bent, into bore 314. When formed using a 3D printing process, lock tabs 310 may be in an unstressed state when extending inward into bore 314.

Figure 5A:
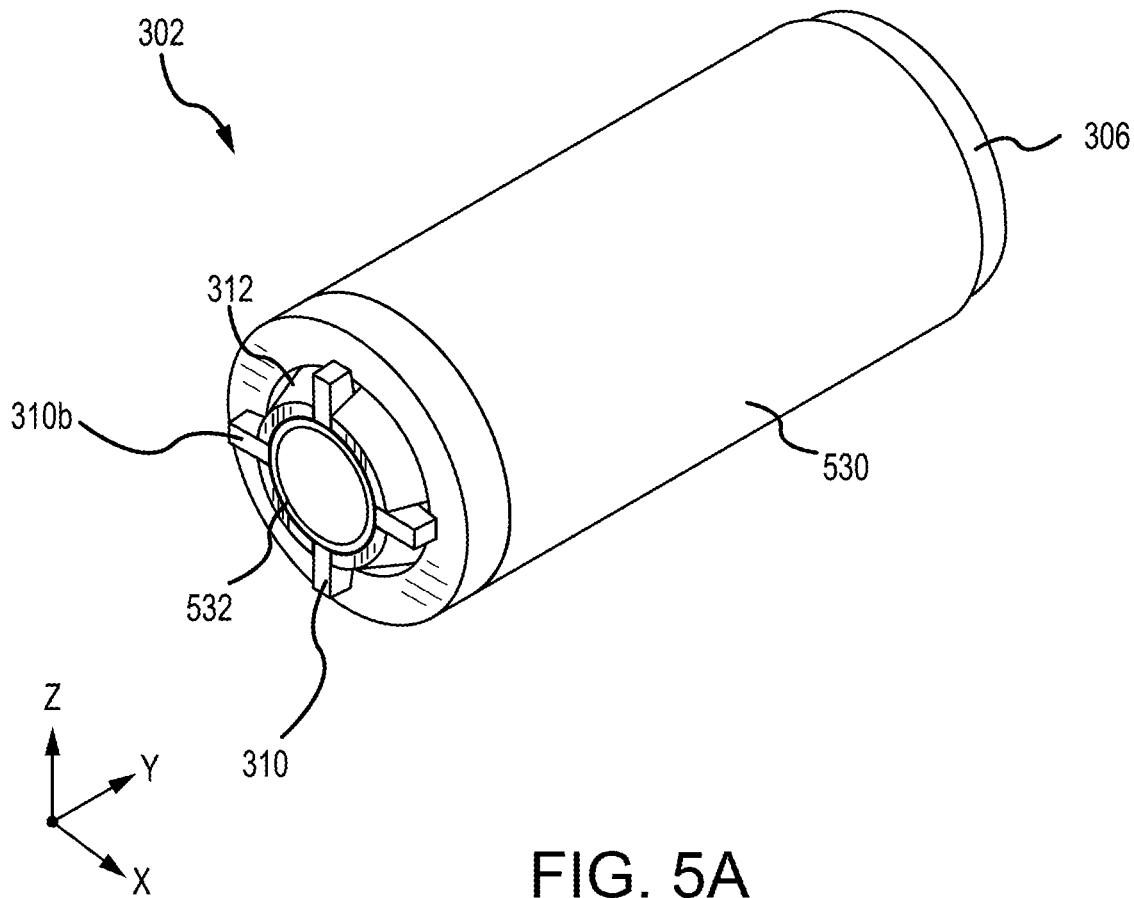
FIGS. 5A, 5B, and 5C illustrate various views of a self-locking bushing after installation, in accordance with various embodiments.
Figure 5B:
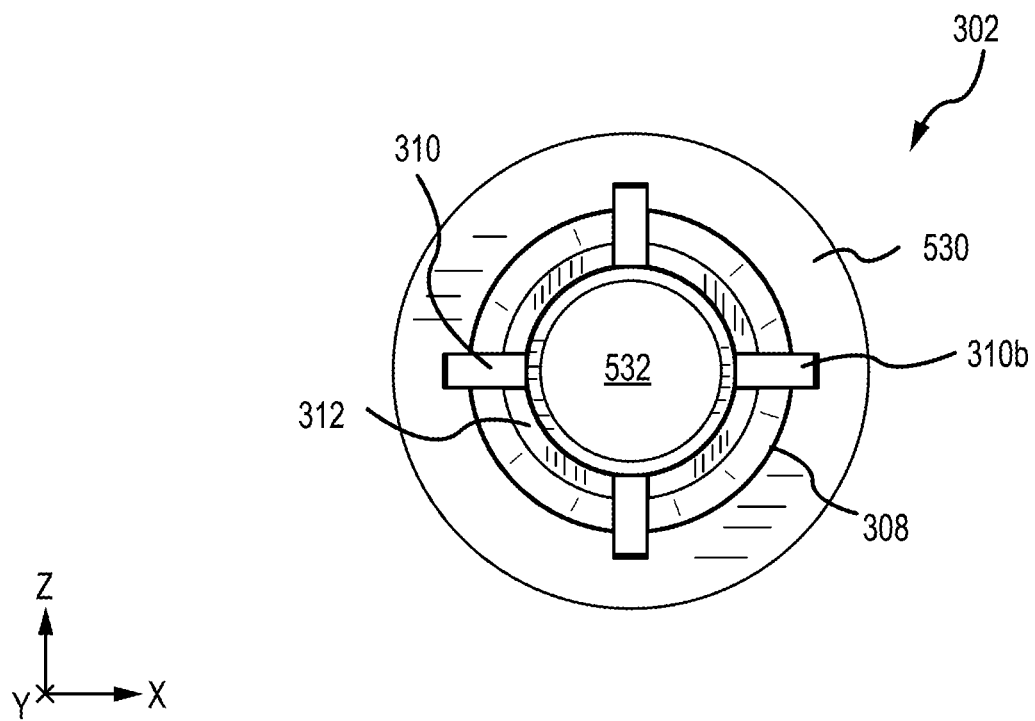
Figure 5C:
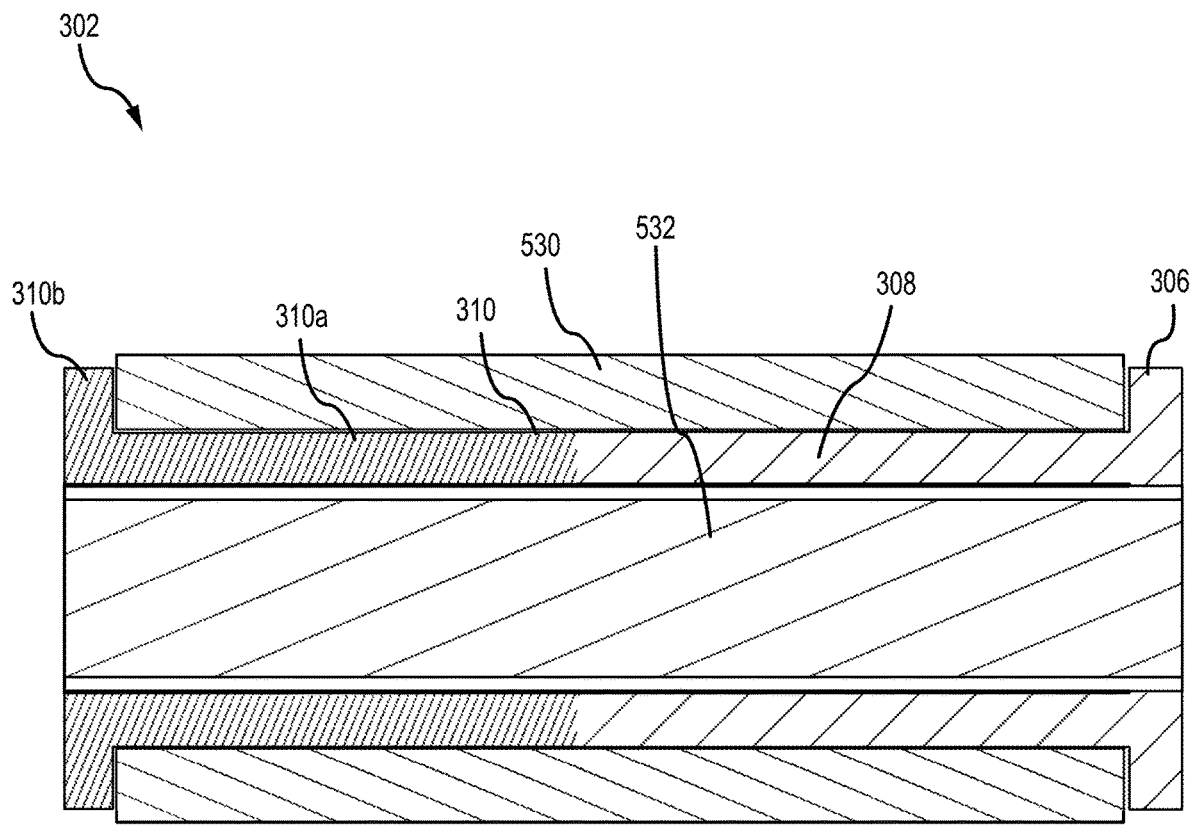
Figure 5C:
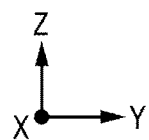

Referring now to FIGS. 5A-5C, illustrated are various views of self-locking bushing 302 after installation into a component 530 using a locking pin 532, in accordance with various embodiments. Component 530 may be an example of dynamic joint 64 formed by first strut 60 and second strut 62 as described above with respect to FIG. 3. FIG. 5A illustrates a perspective view of self-locking bushing 302. FIG. 5B illustrates an end view of self-locking bushing 302. FIG. 5C illustrates a cross section view of self-locking bushing 302. As previously described, self-locking bushing 302 includes flange 306 at a first end of self-locking bushing 302, body 308, one or more lock tabs 310, tapered end 312, and bore 314. Spacers 316, if any were used, are no longer present in self-locking bushing 302 after installation.

During installation, self-locking bushing 302 is pushed into and through component 530 (e.g., in the negative Y direction) until flange 306 engages a first side of component 530. At this point, self-locking bushing 302 is in place and lock tabs 310 extend inward into bore 314 of body 308. Locking pin 532 is then inserted into and pushed through bore 314 (e.g., in the negative Y direction). Locking pin 532 may be similar to pin 304 described above with respect to FIG. 3. As locking pin 532 slides through bore 314, locking pin 532 contacts and engages lock tabs 310, pushing them outward from a center of bore 314 until they are inline with body 308.

In various embodiments, where self-locking bushing 302 is formed using conventional machining, lock tabs 310 are returned (e.g., bent) to their original position. That is, lock tabs 310 are moved from a stressed state (e.g., bent inward into bore 314) back to their original position and are supported by locking pin 532. In various embodiments, where self-locking bushing 302 is formed using 3D printing, lock tabs 310 are moved (e.g., bent) outward to be in line with body 308. That is, lock tabs 310 are moved (e.g., bent) from an unstressed state to a stressed state. However, locking pin 532 provides support to lock tabs 310 preventing them from returning to the unstressed state. Regardless of how self-locking bushing 302 is manufactured, in this position self-locking bushing 302 is locked in place by flange 306 on one end and lock tabs 310, and more specifically, by second portion 310b of lock tabs 310 on the other end.

In various embodiments, component 530 may include one or more mating features configured to engage lock tab(s) 310. In various embodiments, the one or more mating features may be indentations, cutouts, notches, or depressions, among others. The one or more mating features may prevent rotation of self-locking bushing 302 when lock tabs 310 engage the one or more mating features.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5 of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A dynamic joint, the dynamic joint comprising:
   a first component;
   a second component;
   a locking pin; and
   a bushing coupled to the dynamic joint, the bushing comprising:
      a body having a first end and a second end;
      a bore formed through the body from the first end to the second end; and
      a lock tab coupled to the body at a point between the first end and the second end of the body and extending toward the second end of the body, the lock tab extending from the body and into the bore, wherein the bore is configured to receive the locking pin that engages the lock tab, wherein the bushing is configured to extend through the first component and the second component of the dynamic joint, and wherein, by engaging the lock tab, the bushing is configured to secure the first component to the second component of the dynamic joint.

2. The dynamic joint of claim 1, further comprising:
   a flange coupled to the first end of the body.

3. The dynamic joint of claim 1, further comprising:
   a tapered end formed into the second end of the body.

4. The dynamic joint of claim 1, wherein the body is cylindrical.

5. The dynamic joint of claim 1, wherein the lock tab includes a first member extending from the body and a second member extending orthogonally from the first member.

6. The dynamic joint of claim 1, wherein the bushing is formed as a monolithic component using 3D printing.

7. The dynamic joint of claim 1, further comprising:
   a spacer having a first end and a second end, the first end of the spacer coupled to the lock tab and the second end of the spacer coupled to the body.

8. A landing gear assembly, comprising:
   a dynamic joint, wherein the dynamic joint further includes:
      a first component; and
      a second component;
   a locking pin; and
   a bushing coupled to the dynamic joint, wherein the bushing is configured to extend through the first component and the second component, the bushing including:
      a body having a first end and a second end;
      a bore formed through the body from the first end to the second end; and
      a lock tab coupled to the body and extending toward the second end of the body, wherein the locking pin extends through the bore engaging the lock tab and wherein, by engaging the lock tab, the bushing is configured to secure the first component to the second component of the dynamic joint.

9. The landing gear assembly of claim 8, wherein the lock tab engages the first component preventing lateral movement of the bushing in a first direction.

10. The landing gear assembly of claim 9, wherein the lock tab includes:
    a first member extending from the body; and
    a second member extending orthogonally from the first member, the second member engaging the first component.

11. The landing gear assembly of claim 9, wherein the bushing further includes:
    a flange coupled to the first end of the body, the flange preventing lateral movement of the bushing in a second direction opposite the first direction.

12. The landing gear assembly of claim 8, wherein the bushing further includes:
    a tapered end formed into the second end of the body.

13. The landing gear assembly of claim 8, wherein the body is cylindrical.

14. A dynamic joint, the dynamic joint comprising:
    a first component;
    a second component;
    a locking pin; and
    a self-locking bushing coupled to the dynamic joint, the self-locking bushing comprising:
       a cylindrical body extending from a first end to a second end;
       a cylindrical bore formed through the cylindrical body from the first end to the second end;
       a first lock tab extending from the cylindrical body toward the second end, the first lock tab extending into the cylindrical bore in a first direction; and
       a second lock tab extending from the cylindrical body toward the second end, the second lock tab extending into the cylindrical bore in a second direction that is different than the first direction, wherein the cylindrical bore is configured to receive the locking pin that engages the first lock tab and the second lock tab, wherein the self-locking bushing is configured to extend through the first component and the second component of the dynamic joint, and wherein, by engaging the first lock tab and the second lock tab, the self-locking bushing is configured to secure the first component to the second component of the dynamic joint.

15. The dynamic joint of claim 14, wherein the cylindrical body has a first length and the first lock tab has a second length, the second length being less than the first length.

16. The dynamic joint of claim 15, wherein the second length is about 30% to about 70% of the first length.

17. The dynamic joint of claim 14, wherein the first lock tab is formed from the cylindrical body, the cylindrical body and the first lock tab being a monolithic piece.

18. The dynamic joint of claim 14, further comprising:
    a tapered end formed into the second end of the cylindrical body; and
    a flange coupled to the first end of the cylindrical body.

19. The dynamic joint of claim 14, wherein the first lock tab includes a first portion extending from the cylindrical body and a second portion extending orthogonal to the first portion.

* * * * *